United States Patent
Ehrlich

(10) Patent No.: US 9,473,935 B2
(45) Date of Patent: Oct. 18, 2016

(54) DYNAMIC TRANSMISSION OF PERSONAL DATA TO ONLY TRUSTED ENTITIES

(71) Applicant: Robert Ehrlich, Windham, NH (US)

(72) Inventor: Robert Ehrlich, Windham, NH (US)

(73) Assignee: Telecommunication Systems, Inc., Annapolis, MD (US)

( * ) Notice: Subject to any disclaimer, the term of this patent is extended or adjusted under 35 U.S.C. 154(b) by 295 days.

(21) Appl. No.: 13/684,937

(22) Filed: Nov. 26, 2012

(65) Prior Publication Data

US 2013/0143530 A1    Jun. 6, 2013

Related U.S. Application Data

(60) Provisional application No. 61/566,354, filed on Dec. 2, 2011.

(51) Int. Cl.
| | |
|---|---|
| *H04M 1/66* | (2006.01) |
| *H04W 12/06* | (2009.01) |
| *H04W 4/02* | (2009.01) |
| *H04W 4/22* | (2009.01) |
| *H04W 12/08* | (2009.01) |

(52) U.S. Cl.
CPC .............. *H04W 12/06* (2013.01); *H04W 4/02* (2013.01); *H04W 4/22* (2013.01); *H04W 12/08* (2013.01)

(58) Field of Classification Search
CPC ..................................................... H04W 4/12
USPC ............ 455/411, 404.1, 412.1, 412.2, 414.2; 379/37
See application file for complete search history.

(56) References Cited

U.S. PATENT DOCUMENTS

| | | | |
|---|---|---|---|
| 2003/0012344 A1* | 1/2003 | Agarwal et al. | 379/37 |
| 2005/0118983 A1* | 6/2005 | Van Camp | 455/404.2 |
| 2008/0146892 A1* | 6/2008 | LeBoeuf | A61B 5/11 600/300 |
| 2008/0192731 A1 | 8/2008 | Dickinson | |
| 2013/0052982 A1* | 2/2013 | Rohde et al. | 455/404.1 |

* cited by examiner

*Primary Examiner* — Chuck Huynh
(74) *Attorney, Agent, or Firm* — Tarolli, Sundheim, Covell & Tummino LLP

(57) ABSTRACT

Secure storage of important/relevant information on a device and/or internet cloud is facilitated, and enables automatic transmission of that important/relevant information when certain user-defined criteria are met, e.g., when 911 is dialed on a corresponding subscriber device. A baseline data collection and maintenance interface enables a subscriber to provision important/relevant information (e.g. medical/emergency information) authorized for transmittal, intended recipients of data (e.g. emergency personnel), and one or more information exchange events (e.g., dialing 911 on a corresponding subscriber device), in to a subscriber information database. A trigger monitoring server monitors a subscriber device for the occurrence of one or more information exchange events defined in an affiliated subscriber information database. The trigger monitoring server accesses a relevant subscriber information database to dynamically facilitate stored subscriber information to one or more predetermined data recipients, each instance an information exchange event is detected on a corresponding subscriber device.

9 Claims, 1 Drawing Sheet

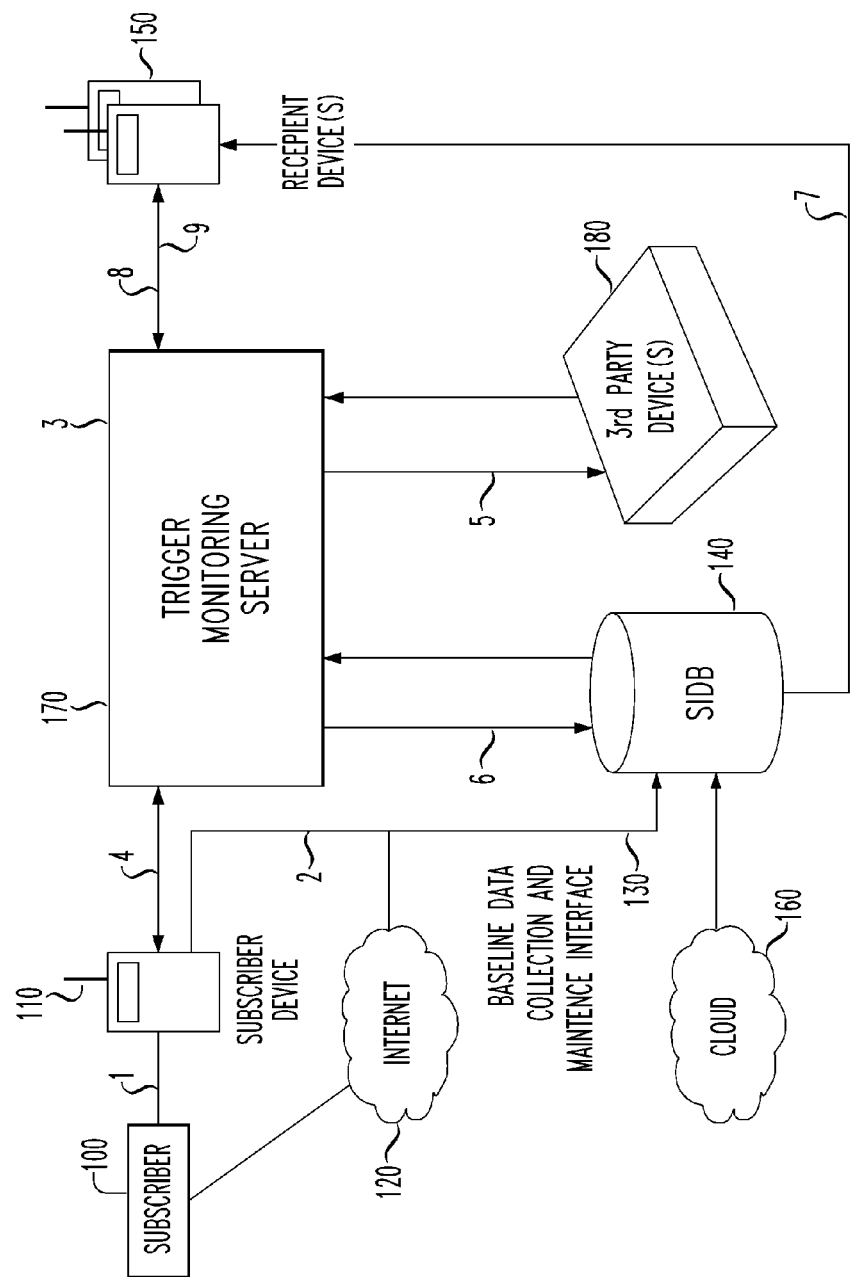

DYNAMIC TRANSMISSION OF PERSONAL DATA TO ONLY TRUSTED ENTITIES

The present invention claims priority from U.S. Provisional Application No. 61/566,354 to Robert EHRLICH, entitled "Dynamic Transmission of Personal Data to Trusted Entities" filed Dec. 2, 2011, the entirety of which is expressly incorporated herein by reference.

BACKGROUND OF THE INVENTION

1. Field of the Invention

This invention relates generally to communications. More particularly, it relates to public safety and messaging.

2. Background of Related Art

An information owner may currently store relevant information on a personal device (e.g. a smartphone) via several known Information Storage Applications. For instance, an "In Case Of Emergency (ICE)" application enables an information owner to store information relevant to an emergency situation (e.g. information concerning medical conditions, allergies, current medications, emergency contacts, etc.) on a personal device. Therefore, in the event of an emergency, an emergency responder may click on an In Case Of Emergency (ICE) application icon located on a subscriber's personal device (e.g. smartphone) to access important, potentially life-saving information.

following documents provide examples of how data is saved via an In Case of Emergency (ICE) application: http://en.wikipedia.org/wiki/In_case_of_emergency, http://ice-app.net/, and http://itunes.apple.com/us/app/smart-ice-in-case-of-emergency/id315171830?mt=8.

In particular, when an Information Storage application is first launched, a subscriber entity is prompted to provision medical/emergency information associated with the users of a corresponding subscriber device (e.g. a smartphone) into appropriately categorized data fields, e.g., individual data fields categorized for medical information, emergency contact information, indentifying information, etc. Once saved, information stored for that particular subscriber entity may be manually accessed on that subscriber entity's device.

Although current applications enable information to be stored on a device (e.g. a smartphone), stored information is still only maintained by the information owner and transmitted via manual methods.

The inventor herein has recognized that existing technologies (e.g. ICE technologies) do not provide automatic transmission of stored subscriber information. Rather, existing technologies merely permit information to be stored on an information owner's device, and manually provide the same for reading, as needed by others.

SUMMARY

In accordance with the principles of the present invention, a method and apparatus to facilitate secure storage of subscriber information on a device and/or internet cloud (i.e. internet based cloud location), and to allow for automatic transmission of that stored information when certain user-defined criteria (e.g. 911 type services are contacted from a subscriber device(s), pre-determined key strokes are made by subscriber, pressing a help key on a corresponding subscriber device, etc.) are met, comprises a trigger monitoring server and a baseline data collection and maintenance interface.

In accordance with the principles of the present invention, a subscriber entity uses a baseline data collection and maintenance interface to provision personal information associated with users (e.g. Subscriber, potential users such as the subscriber's wife and/or children, etc.) of a corresponding subscriber device in to a subscriber information database. Personal information maintained in a subscriber information database preferably comprises: important/relevant information (e.g., identifying data, health conditions, current medications, emergency contacts, geolocation of a corresponding subscriber device, etc.) authorized for transmittal, to one or more intended data recipients (e.g., emergency personnel, one or more subscriber defined recipients/requestors, and/or one or more subscriber defined digital addresses, etc.), upon one or more information exchange events (e.g., dialing 911 on a corresponding subscriber device, pre-determined key strokes are made by subscriber, pressing a help key on a corresponding subscriber device, etc.) upon which to transmit information authorized for transmittal.

In accordance with the principles of the present invention, an inventive trigger monitoring server continuously monitors a subscriber device for information exchange events defined in a subscriber information database associated with that subscriber device. Moreover, the inventive trigger monitoring server continuously monitors a subscriber information database associated with a given subscriber device, to assure that accurate and up-to-date information exchange events are being detected.

In accordance with the principles of the present invention, an information exchange event (e.g., 911 is dialed on a corresponding subscriber device, pre-determined key strokes are made by subscriber, a help key is activated on a corresponding subscriber device, approved friends or family members request authorized subscriber information, etc.) is a set of user defined criteria, that, when carried out on a given subscriber device, prompts the inventive trigger monitoring server to transmit important/relevant information pre-provisioned for that subscriber device, to one or more predetermined data recipients. In particular, when a trigger monitoring server detects an information exchange event on a given subscriber device, the trigger monitoring server prompts important/relevant information stored in a subscriber information database associated with that subscriber device, to be transmitted to one or more subscriber defined data recipients.

In accordance with another aspect of the present invention, when applicable, the trigger monitoring server prompts subscriber defined $3^{rd}$ party mobile to mobile (M2M) devices to furnish additional subscriber information for a given subscriber entity, once an information exchange event is detected on that subscriber entity's subscriber device. Additional caller information is uploaded to a subscriber information database associated with the relevant subscriber entity and transmitted with personal background database information to one or more predetermined data recipients.

In accordance with the principles of the present invention, a subscriber defined data recipient (e.g. emergency personnel, one or more subscriber defined recipients/requestors, and/or one or more subscriber defined digital address, etc.) may also act as a data requestor, to request and access subscriber information stored for a particular subscriber entity, when an information exchange event is initiated on that subscriber entity's subscriber device.

BRIEF DESCRIPTION OF THE DRAWINGS

Features and advantages of the present invention become apparent to those skilled in the art from the following description with reference to the drawings, in which:

FIG. 1 portrays exemplary dynamic transmission of stored subscriber information to one or more predetermined data recipients, in accordance with the principles of the present invention.

DETAILED DESCRIPTION OF ILLUSTRATIVE EMBODIMENTS

The present invention facilitates the secure storage of important/relevant information (i.e. information defined by an information owner as relevant) on a device (e.g. smartphone) and/or internet cloud, and allows for automatic transmission of that important/relevant information when certain user-defined criteria are met (e.g., when 911 is dialed on a corresponding subscriber device, pre-determined key strokes are made by subscriber, when a help key is activated on a corresponding subscriber device, approved friends or family members request authorized subscriber information, etc.)

In particular, information believed to be relevant to a subscriber entity is edited, entered into a database, and automatically transmitted to one or more predetermined data recipients (e.g. emergency personnel, one or more subscriber defined recipients/requestors, and/or one or more subscriber defined digital addresses, etc.), each instance a subscriber defined information exchange event (e.g., 911 is dialed on a corresponding subscriber device, pre-determined key strokes are made by subscriber, a help key is activated on a corresponding subscriber device, approved friends or family members request authorized subscriber information, etc.) is triggered on that subscriber entity's subscriber device (e.g a smartphone). Current technologies (e.g. prior art "In Case of Emergency" (ICE) technologies) do not provide automatic transmission of data.

In accordance with the principles of the present invention, important/relevant information is stored on a subscriber device and/or internet cloud (i.e. internet based cloud location) for automatic transmission upon occurrence of an information exchange event (e.g., 911 is dialed on a corresponding subscriber device, pre-determined key strokes are made by subscriber, a help key is activated on a corresponding subscriber device, approved friends or family members request authorized subscriber information, etc.), via a baseline data collection and maintenance interface. In particular, a subscriber entity uses a baseline data collection and maintenance interface to provision personal information associated with users of a corresponding subscriber device in to a subscriber information database. Personal information maintained in a subscriber information database preferably comprises: important/relevant information (e.g., identifying data, health conditions, current medications, emergency contacts, travel plans, geolocation of a corresponding subscriber device, other associated subscriber devices, M2M associated devices, etc.) authorized for transmittal, one or more intended data recipients (e.g., emergency personnel, one or more subscriber defined recipients/requestors, and/or one or more subscriber defined digital addresses, etc.) to which to transmit information authorized for transmittal, and one or more information exchange events (e.g., dialing 911 on a corresponding subscriber device, pre-determined key strokes are made by subscriber, pressing a help key on a corresponding subscriber device, etc.) upon which to transmit information authorized for transmittal. In addition, a subscriber entity may optionally provision one or more preferred methods of data transmission (e.g. SMS, email, IM, etc.), and/or one or more $3^{rd}$ party mobile to mobile (M2M) devices in to a subscriber information database. A $3^{rd}$ party mobile to mobile (M2M) device maintained in a subscriber information database for a given subscriber entity, is prompted (when technically possible) to provide additional $3^{rd}$ party information for that subscriber entity, for each instance an information exchange event is detected on that subscriber entity's subscriber device. A subscriber information database, provisioned for a particular subscriber entity, is maintained on a corresponding subscriber device and/or an internet based cloud location, as predetermined by the subscriber entity.

In accordance with the principles of the present invention, stored subscriber information is dynamically transmitted to one or more predetermined data recipients upon detection of an information exchange event on a relevant subscriber device, via a trigger monitoring server. In particular, the inventive trigger monitoring server and/or device application(s) continuously monitors subscriber device(s) for information exchange events (e.g., dialing 911 on a corresponding subscriber device, pre-determined key strokes are made by subscriber, pressing a help key on a corresponding subscriber device, approved friends or family members request authorized subscriber information, etc.) defined in a subscriber information database associated with that subscriber device. Moreover, the trigger monitoring server continuously monitors the subscriber information database associated with that particular subscriber device, to assure that accurate and up-to-date information exchange events are being detected.

In accordance with the principles of the present invention, an information exchange event (e.g. 911 is dialed on a corresponding subscriber device, pre-determined key strokes are made by subscriber, a help key is activated on a corresponding subscriber device, approved friends or family members request authorized subscriber information, etc.) is a set of subscriber defined criteria, that, when carried out on a corresponding subscriber device, triggers the inventive trigger monitoring server to authorize and transmit important/relevant information pre-provisioned for that particular subscriber device, to one or more predetermined data recipients, (e.g., emergency personnel, one or more subscriber defined recipients/requestors, and/or one or more subscriber defined digital addresses, etc.) The trigger monitoring server only permits data provisioned authorized by a data owner to be revealed to a non-data owner.

In accordance with the principles of the present invention, when applicable, the trigger monitoring server prompts subscriber defined $3^{rd}$ party mobile to mobile (M2M) devices (e.g. a heart monitor, glucose monitor, etc.) to furnish additional subscriber information for a given subscriber entity, once an information exchange event is triggered (e.g. 911 is dialed on a corresponding subscriber device, pre-determined key strokes are made by subscriber, a help key is activated on a corresponding subscriber device, approved friends or family members request authorized subscriber information, etc.) on that subscriber entity's subscriber device. Additional $3^{rd}$ party information is uploaded to a subscriber entity's subscriber information database (when technically possible) and transmitted with stored personal background database information to one or more previously determined data recipients (e.g., emergency personnel, one or more subscriber defined recipients/requestors, and/or one or more subscriber defined digital addresses, etc.).

In accordance with another aspect of the present invention, a subscriber defined data recipient (e.g. an emergency personnel, One or more subscriber defined recipients/requestors, and/or one or more subscriber defined digital address, etc.) may also act as a data requestor, to request and access important/relevant information stored for a particular subscriber entity, once an information exchange event is detected on that subscriber entity's subscriber device.

Further yet, subscriber information stored on a subscriber device is manually accessible for reading, as need by others (e.g. a first responder may find a subscriber device and enter 'help' in a password protected field to receive stored subscriber information) when an information exchange event is triggered (e.g. 911 is dialed on a corresponding subscriber device, pre-determined key strokes are made by subscriber, a help key is activated on a corresponding subscriber device, approved friends or family members request authorized subscriber information, etc.) on that particular subscriber device.

FIG. 1 portrays exemplary dynamic transmission of stored subscriber information to one or more predetermined data recipients, in accordance with the principles of the present invention.

In particular, during subscription and ongoing account maintenance procedures, a subscriber entity 100 uses a subscriber device(s) (e.g. a smartphone or other connected device) 110 and/or web based application 120 to access an inventive baseline data collection and maintenance interface 130, as depicted in step 1 of FIG. 1. The subscriber entity 100 uses the baseline data collection and maintenance interface 130 to provision important/relevant information (i.e. information believed to be relevant to the subscriber entity 100) associated with users of a corresponding subscriber device(s) 110 in to a subscriber information database 140, as shown in step 2. In accordance with the principles of the present invention, information provisioned in to the subscriber information database 140 in step 2 preferably comprises: important/relevant information (e.g., medical conditions, current medications, a geolocation of the corresponding subscriber device 110, etc.) authorized for transmittal, one or more information exchange events (e.g. dialing 911 on the corresponding subscriber device 110, dialing a certain sequence of keystrokes on the corresponding subscriber device 110, pressing a 'help' key on the corresponding subscriber device 110, etc.) upon which to transmit important/relevant information authorized for transmittal, and one or more intended data recipients (e.g. emergency personnel, one or more subscriber defined recipients/requestors, and/or one or more subscriber defined digital addresses, etc.) 150 to which to transmit important/relevant information authorized for transmittal. A desired method of data transmission and a third party mobile-to-mobile (M2M) device 180 (from which to attain additional subscriber information) is also provisioned in to the subscriber information database 140 by the subscriber entity 100 in step 2.

As depicted in FIG. 1, the subscriber information database 140 is maintained on the subscriber entity's 100 subscriber device 110 and/or an internet based cloud location 160, as predetermined by the subscriber entity 100. In particular, the subscriber information database 140 may be maintained on the subscriber device 110 only, to mitigate security concerns and/or concerns pertaining to relevant laws and/or regulations (e.g. Health Insurance Portability and Accountability Act). Rather, the subscriber information database 140 may be maintained on both the subscriber device 110 and the internet based cloud location 160, to promote data redundancy and data resiliency.

In accordance with the principles of the present invention, when the subscriber information database 140 is stored on both the subscriber device 110 and the internet based cloud location 160, data stored at both locations (110 and 160) may be periodically synched to assure that stored subscriber information is accurate and up-to-date. In addition, any changes made to data stored on the subscriber device 110 may be automatically uploaded to the cloud based 160 subscriber information database 140, as permitted by the subscriber entity 100.

Further, subscriber information that is stored on the subscriber device 110 is transmitted directly from the subscriber device 110 to one or more intended data recipients 150, each instance an information exchange event is triggered on that particular subscriber device 110.

Alternatively, subscriber information that is stored on the internet cloud 160 is transmitted directly from the internet cloud 160 to one or more intended data recipients 150, via IP, each instance an information exchange event is triggered on that particular subscriber device 110.

As portrayed in step 3, an inventive trigger monitoring server 170 continuously monitors the subscriber device 110 and the subscriber information database 140 provisioned for that subscriber device 110, to detect any susbcriber-defined information exchange events carried out on the subscriber device 110.

In step 4, an information exchange event (e.g. dialing 911 on the corresponding subscriber device 110, dialing a certain sequence of keystrokes on the corresponding subscriber device 110, pressing a 'help' key on the corresponding subscriber device 110, etc.) is carried out on the subscriber device 110.

As depicted in step 5, action taken by the subscriber device in step 4 prompts the trigger monitoring server 170 to send a subscriber information query to the third party mobile-to-mobile (M2M) device 180 defined by the subscriber entity 100 in step 2.

In step 6, the trigger monitoring server 170 obtains and uploads additional third party information to the localized 110 database of subscriber information 140 and/or the optional cloud based 160 database of subscriber information 140, and then instructs additional third party information to be transmitted with stored personal background database information, to one or more desired data recipients 150 (e.g. emergency personnel, one or more subscriber defined recipients/requestors, and/or one or more subscriber defined digital addresses, etc.) defined by the subscriber entity 100 in step 2.

In step 7, stored subscriber information is transmitted directly from the subscriber information database 140 maintained on the network connected subscriber device 110 and/or directly from the optional cloud based 160 subscriber information database 140, via a method of data transmission (e.g. IP, SMS, or email) defined by the subscriber entity 100 in step 2. For example, if the subscriber device 110 is Session Internet Protocol (SIP) capable, the subscriber entity 100 may instruct subscriber information to be sent from the device 110 as a MEME or other SIP attached data. Stored subscriber information may also be transmitted to predetermined data recipients 150 via Internet Protocol (IP), Short Message Service (SMS), or email, as predetermined by the subscriber entity 100. In accordance with the principles of the present invention, if a preferred method of data transmission is not stored in the subscriber information database 140 stored for the subscriber entity 100, the trigger monitoring server 170 instructs subscriber information to be transmitted to intended data recipients via a method that is deemed most appropriate.

In step 8, a subscriber defined data recipient 150 (e.g. a family member, friend, trusted entity) acts as a data requestor 150a, and sends a subscriber information query to the trigger monitoring server 170, requesting subscriber information stored for the relevant subscriber entity 100 (e.g. a subscriber defined requestor 150 may wish to request subscriber information stored for the subscriber entity 100 when the subscriber entity 100 is incapacitated).

In step 9, the trigger monitoring server 170 receives the subscriber information query transmitted in step 8, and compares identifying credentials obtained therefrom, to authorized recipient credentials maintained in the subscriber entity's 100 subscriber information database 140, to verify that the data requestor 150*a* is authorized to receive subscriber information for the relevant subscriber entity 100. Upon verification, the trigger monitoring server 170 prompts subscriber information authorized for transmittal in the subscriber information database 140, to be transmitted to the relevant data requestor 150*a*, in accordance with the same sequence of actions previously shown and described with reference to step 7.

The present invention permits a subscriber entity 100 to automatically furnish emergency information to one or more predefined trusted entities (e.g. a 911 dispatcher) 150 upon initiation of an emergency event.

Prior TCS patent publication 2008/0192731 describes a method of exchanging information via a common telephone number-based web page which may be used to exchange information within the present invention.

In addition, prior TCS patent publication US 2008/0192731 also describes methods of releasing profile data stored for a subscriber device to a CIDB. Methods of releasing profile data include: sending profile data to a CIDB directly from a subscriber device, sending profile data to a CIDB directly from an internet cloud, enabling a CIDB to access profile data via a URL pointing to an internet cloud copy.

The present invention relates particularly to users of emergency 911, and/or to anyone needing help or assistance from emergency personnel or trusted colleagues/family members.

While the invention has been described with reference to the exemplary embodiments thereof, those skilled in the art will be able to make various modifications to the described embodiments of the invention without departing from the true spirit and scope of the invention.

What is claimed is:

1. A method for remotely monitoring a given subscriber device for an information exchange trigger event detected on the given subscriber device, comprising:
   securely pre-storing subscriber information, received from a subscriber device associated with a given subscriber, in a subscriber information database separate of the subscriber device;
   pre-authorizing a pre-designated third party recipient device for reception of the secure pre-stored subscriber information;
   monitoring, via a remote trigger monitoring network server, the subscriber device to detect an occurrence of an information exchange trigger event on the monitored subscriber device;
   transmitting, via the remote trigger monitoring network server, the secure pre-stored subscriber information to the pre-authorized pre-designated third party recipient device in response to detecting the information exchange trigger event;
   causing a second subscriber device associated with the given subscriber to transmit additional subscriber information to the remote trigger monitoring network server in response to the information exchange trigger event; and
   transmitting, via the remote trigger monitoring network server, the secure pre-stored subscriber information and the additional subscriber information to the pre-authorized pre-designated third party recipient device,
   wherein the subscriber device outputs the secure pre-stored subscriber information in response to the information exchange trigger event and user input.

2. The method for remotely monitoring a given subscriber device for an information exchange trigger event detected on the given subscriber device according to claim 1, wherein the subscriber information database comprises: an emergency information database.

3. The method for remotely monitoring a given subscriber device for an information exchange trigger event detected on said given subscriber device according to claim 1, wherein the one or more pre-designated third party recipient devices comprise: an emergency services device.

4. The method for remotely monitoring a given subscriber device for an information exchange trigger event detected on the given subscriber device according to claim 1, wherein the one or more pre-designated third party recipient devices comprise: a destination device identified within an address book maintained on the subscriber device.

5. The method for remotely monitoring a given subscriber device for an information exchange trigger event detected on the given subscriber device according to claim 4, wherein: the address book is stored on the subscriber device.

6. A server to facilitate automatic, pre-authorized transmittal of secure pre-stored subscriber information to one or more pre-designated third party recipient devices when a subscriber pre-defined information exchange trigger event is detected on a corresponding subscriber device according to claim 1, wherein: the secure pre-stored subscriber information is transmitted via email only to the one or more pre-designated third party recipient devices.

7. A server to facilitate automatic, pre-authorized transmittal of secure pre-stored subscriber information to one or more pre-designated third party recipient devices when a subscriber pre-defined information exchange trigger event is detected on a corresponding subscriber device according to claim 1, wherein: the secure pre-stored subscriber information is transmitted via text message only to said one or more pre-designated third party recipient devices.

8. The method for remotely monitoring a given subscriber device for an information exchange trigger event detected on the given subscriber device according to claim 1, wherein the additional subscriber information is real-time information captured via the second subscriber device.

9. The method for remotely monitoring a given subscriber device for an information exchange trigger event detected on the given subscriber device according to claim 1, wherein the second subscriber device is one of a heart and a glucose monitoring device.

\* \* \* \* \*